(12) United States Patent
Wardle

(10) Patent No.: US 9,838,418 B1
(45) Date of Patent: Dec. 5, 2017

(54) DETECTING MALWARE IN MIXED CONTENT FILES

(71) Applicant: SYNACK, INC., Redwood City, CA (US)

(72) Inventor: Patrick Wardle, Maui, HI (US)

(73) Assignee: SYNACK, INC., Redwood City, CA (US)

( * ) Notice: Subject to any disclaimer, the term of this patent is extended or adjusted under 35 U.S.C. 154(b) by 128 days.

(21) Appl. No.: 14/659,385

(22) Filed: Mar. 16, 2015

(51) Int. Cl.
*H04L 29/06* (2006.01)
*G06F 21/55* (2013.01)
*G06F 21/56* (2013.01)

(52) U.S. Cl.
CPC ............ *H04L 63/145* (2013.01); *G06F 21/55* (2013.01); *G06F 21/56* (2013.01)

(58) Field of Classification Search
CPC ............. H04L 63/145; H04L 29/06911; H04L 29/06925; H04L 29/06931; H04L 29/06938; G06F 21/55; G06F 21/56
See application file for complete search history.

(56) References Cited

U.S. PATENT DOCUMENTS

| 7,472,422 | B1 * | 12/2008 | Agbabian | ............... H04L 41/06 726/25 |
| 9,009,820 | B1 * | 4/2015 | McDougal | .............. G06F 21/56 726/22 |
| 9,246,933 | B1 * | 1/2016 | Krishnappa | ......... H04L 63/1433 |
| 9,268,689 | B1 * | 2/2016 | Chen | ................... G06F 12/0292 |
| 9,367,687 | B1 * | 6/2016 | Warshenbrot | ......... G06F 21/566 |
| 9,483,644 | B1 * | 11/2016 | Paithane | ................. G06F 21/56 |

(Continued)

OTHER PUBLICATIONS

Simon, File Encryption without Passwords, published in Google, http://www.anotherwindowsblog.com/2011/09/file-encryption-without-passwords.html, Sep. 7, 2011, 2 pages.*

*Primary Examiner* — Hadi Armouche
*Assistant Examiner* — Sher A Khan
(74) *Attorney, Agent, or Firm* — Hickman Palermo Becker Bingham LLP

(57) ABSTRACT

Computer systems and methods in various embodiments are configured to determine whether a file is likely to be malware-free or include malware. In an embodiment, a computer system configured to improve security of client computers, and comprising: a memory; one or more processors coupled to the memory; a malware detection logic coupled to the memory and the one or more processors, and configured to: receive a first file from a viewer program that is executing on the client computer, wherein the first file is a mixed content file comprising a combination of both executable instructions and data in one or more formats, and/or one or more data sets stored in one or more other formats; determine that the first file is formatted according to a first specification and that the first specification is associated with one or more first malware tests of a plurality of malware tests, wherein each test in the plurality of malware tests is associated with a score; execute each test in the first one or more malware tests, and add, to a first total score, the score associated with the test if the first file satisfies the test; determine the first total score satisfies a first threshold, and in response, send data to the viewer program indicating that the first file is likely to include malware.

18 Claims, 3 Drawing Sheets

(56) References Cited

U.S. PATENT DOCUMENTS

| | | | |
|---|---|---|---|
| 2003/0231767 A1* | 12/2003 | Carbajal | H04N 21/631 380/200 |
| 2005/0187934 A1* | 8/2005 | Motsinger | H04L 63/107 |
| 2008/0016339 A1* | 1/2008 | Shukla | G06F 21/53 713/164 |
| 2009/0126012 A1* | 5/2009 | Treadwell | G06F 21/56 726/22 |
| 2009/0158412 A1* | 6/2009 | Miller | G06F 21/41 726/8 |
| 2010/0169763 A1* | 7/2010 | Zahavi | H04L 67/20 715/234 |
| 2011/0219450 A1* | 9/2011 | McDougal | G06F 21/56 726/23 |
| 2011/0219451 A1* | 9/2011 | McDougal | G06F 21/562 726/23 |
| 2013/0097705 A1* | 4/2013 | Montoro | G06F 21/562 726/24 |
| 2013/0111591 A1* | 5/2013 | Topan | G06F 21/563 726/24 |
| 2013/0145466 A1* | 6/2013 | Richard | G06F 21/562 726/23 |
| 2013/0305373 A1* | 11/2013 | Lim | G06F 21/56 |
| 2013/0321435 A1* | 12/2013 | Stevens, III | G06F 3/00 345/522 |
| 2014/0123279 A1* | 5/2014 | Bishop | H04L 63/1491 726/23 |
| 2014/0165203 A1* | 6/2014 | Friedrichs | G06F 21/56 726/24 |
| 2014/0283078 A1* | 9/2014 | Redfoot | H04L 63/1441 726/24 |
| 2015/0082440 A1* | 3/2015 | Pickett | H04L 63/145 726/24 |

\* cited by examiner

DETECTING MALWARE IN MIXED CONTENT FILES

FIELD OF THE DISCLOSURE

The present disclosure generally relates to security techniques applicable to computer security, and relates more specifically to improved techniques for detecting malware embedded in a file. SUGGESTED GROUP ART UNIT: 2431 (INFORMATION SECURITY); SUGGESTED CLASSIFICATION: 726.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern file specifications may allow a file to include different types of content stored in the same file. For example, a HyperText Markup Language ("HTML") file may include data stored in an eXtensible Markup Language ("XML") format and/or one or more JavaScript instructions. A file that includes multiple types of content may be referred to as a mixed content file. Each content type may include data or instructions.

Viewer programs, such as a browser, may be sophisticated software programs that process the data and execute the instructions in a mixed content file. Viewer programs may support a wide range of functionality to allow content providers to create rich user experiences and critical functionality.

Unfortunately, a malicious user may embed malware in a file that exploits functionality supported by the viewer program. Detecting malware in a file may be difficult for many reasons: instructions that are used for legitimate purposes may also be used maliciously; malicious instructions (also referred to herein as malware) may be intermingled with legitimate instructions that provide additional functionality or improve a user's experience. For example, a file may include one or more legitimate instructions, which when executed by a viewer program causes the viewer program to send data entered by a user to a different computer, such as a printer. However, the same file may include one or more similar instructions which when executed by a viewer program causes the viewer program to gather data entered by a user and send the data to an online database for the malicious user to use or sell.

SUMMARY

The appended claims may serve as a summary of the invention.

Figure 1:
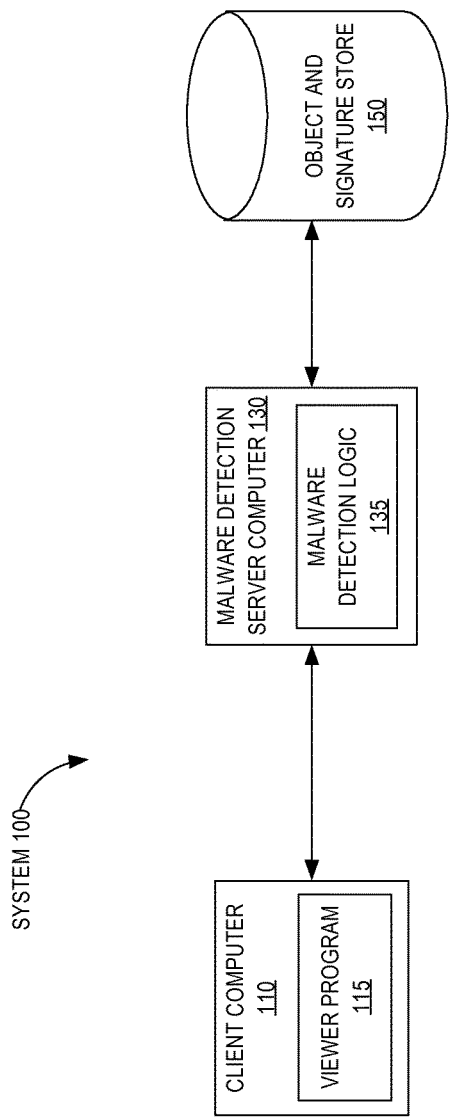
FIG. 1 illustrates a computer system for detecting malware embedded in one or more files stored and/or downloaded at a client computer in an example embodiment.

While each of the drawing figures illustrates a particular embodiment for purposes of illustrating a clear example, other embodiments may omit, add to, reorder, and/or modify any of the elements shown in the drawing figures. While the figures include lines that indicate various devices and/or modules being communicatively coupled, each of the computers, devices, modules, storages, and configurations may be communicatively coupled with each other. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
- 1.0 General Overview
- 2.0 Process Overview
- 3.0 Anatomy of a File
  - 3.1 Mixed Content Files
  - 3.2 Viewer Programs
- 4.0 Tests for Determining Whether a File Includes Malware
  - 4.1 Testing for a Hidden Object
  - 4.2 Testing for Executable Instructions
  - 4.3 Testing for Objects that are Automatically Executed
  - 4.4 Testing for Objects that are Not Automatically Executed
  - 4.5 Testing for Extractable Instructions
  - 4.6 Testing for Obfuscated Instructions
  - 4.7 Testing for Suspicious Words
  - 4.8 Testing with One or More Anti-Virus Engines
  - 4.9 Testing for Common Vulnerabilities and Exposures Signatures
  - 4.10 Testing for Data and/or Instructions After an End of File Tag
  - 4.11 Testing for Password Encryption
  - 4.12 Testing for Multiple Headers
  - 4.13 Testing for Safe Compression Filters
  - 4.14 Testing for Safe Code Signatures
  - 4.15 Testing for a Limited Amount of Executable Instructions
  - 4.16 Testing for Validation Instructions
- 5.0 Example Network Topology for Detecting Malware Embedded in One or More Mixed Content Files Stored at a Client Computer
  - 5.1 Malware Detection Server Computer
  - 5.2 Object and Signature Store
  - 5.3 Client Computer
- 6.0 Example Process for Determining Whether a Mixed Content File is Likely to Include Malware
  - 6.1 Receiving a Mixed Content File From a Client Computer
  - 6.2 Determining One or More Malware Tests to Execute Against the Mixed Content File
  - 6.3 Determining Whether the Mixed Content File is Likely to Include Malware 6.4 Determining Whether the Mixed Content File is Likely to be Malware-Free, Likely to Include Malware, or Dubious 6.5 Notifying the Client Computer and Acting on the Determination Made by the Malware Detection Logic 7.0 Implementation Mechanisms—Hardware Overview 8.0 Other Aspects of Disclosure 1.0 General Overview In an embodiment, a computer system configured to improve security of client computers, and comprising: a memory; one or more processors coupled to the memory; a malware detection logic coupled to the memory and the one or more processors, and configured to: receive a first file from a viewer program that is executing on the client computer, wherein the first file is a mixed content file comprising a combination of both executable instructions and data in one or more formats, and/or one or more data sets stored in one or more other formats; determine that the first file is formatted according to a first specification and that the first specification is associated with one or more first malware tests of a plurality of malware tests, wherein each test in the plurality of malware tests is associated with a score; execute each test in the first one or more malware tests, and add, to a first total score, the score associated with the test if the first file satisfies the test; determine the first total score satisfies a first threshold, and in response, send data to the viewer program indicating that the first file is likely to include malware.

In an embodiment, in response to receiving data indicating that the first file is likely to include malware, the viewer program is configured to delete the first file from memory without persistently storing the first file.

In an embodiment, the malware detection logic is configured to: receive a second file from a viewer program; determine that the second file is formatted according to the first specification; execute each test in the first one or more malware tests, and add, to a second total score, the score associated with the test if the second file satisfies the test; determine the second total score satisfies a second threshold, and in response, send data to the viewer program indicating that the second file is likely to be malware-free.

In an embodiment, the malware detection logic is configured to: receive a second file from a viewer program; determine that the second file is formatted according to a second specification and the second specification is associated with one or more second malware tests of the plurality of malware tests, wherein at least one test in the one or more second malware tests is not in the one or more first malware tests; execute each test in the one or more second malware tests, and add, to a second total score, the score associated with the test if the second file satisfies the test; determine the second total score satisfies a first threshold, and in response, send data to the viewer program indicating that the second file is likely to include malware.

In an embodiment, a method comprises: receiving, at a viewer program, from a server computer, a mixed content file comprising a combination of both executable instructions and data in one or more formats, and/or one or more data sets stored in one or more other formats according to a particular specification; determining that a malware detection server computer is configured to determine whether the mixed content file is formatted according to the particular specification; before processing the mixed content file, sending the mixed content file to a malware detection server computer, wherein the malware detection server computer is configured to determine whether the mixed content file is formatted according to the particular specification, and in response, perform one or more first malware test of a plurality of malware tests to determine whether the mixed content file is likely to include malware; receiving, from the malware detection server computer, a result indicating whether the mixed content file is likely to include malware; determining whether the mixed content file is likely to include malware based on the result.

Embodiments discussed herein provide numerous benefits and improvements over the general idea of protecting a computer from malware. For example, one or more of the embodiments discussed herein test to determine whether a particular file includes instructions are likely to include malware. One or more embodiments discussed herein may be used to protect multiple computers distributed across one or more computer networks.

2.0 Process Overview

A server computer may receive a file from a client computer, detect one or more features in the file, and determine whether the file is likely to include malware. The file may be a mixed content file, discussed further in detail.

The server computer may determine that a file is organized according to a particular specification based upon a file extension value or data within the file. For example, a PDF file may include a ".pdf" extension and/or include a tag that identifies the file as a PDF file. The file may include a tag and/or other data that indicates the file adheres to a particular version of a specification.

The server computer may select one or more tests to determine whether the file is likely to be malware-free or likely to include malware. A malware-free file may be a file that does not include malware. For example, the server computer may determine that the version identified in the PDF file corresponds to a PDF version that does not support JavaScript. Accordingly, the server computer may select one or more tests to determine whether the file includes JavaScript. If the file includes JavaScript, then the file may be more likely to include malware.

The server computer may execute the one or more tests. For example, the server computer may execute a first test to determine whether the file includes JavaScript by searching for common JavaScript keywords or syntax, such as "var", "function", and/or semicolons and the end of multiple lines. The server computer may execute a second test that detects whether the JavaScript is included in a block or section of the file that should be automatically executed by a viewer program when the file displayed. The server computer may execute a third test that determines whether the JavaScript in the document is designed to be displayed, but not executed.

A score may be associated with each test. For example, the first test in the previous example is associated with 10 points, the second test in the previous example is associated with 15 points, and the third test is associated with −20 points.

The server computer may add the score of each satisfied test to determine a total score for the file. For purposes of illustrating a clear example, assume the file satisfies the first test and the third test, but not the second test. Accordingly, the server computer may add the points associated with the first test (10) with the points associated with the third test (−20) for a total score of −10.

The server computer may determine whether the file is likely to be malware-free or include malware based on the total score. For example, if the total score is equal to or less than −5, then the server computer may determine that the file is likely to be malware-free. If, however, the total score is greater than or equal to 10, then the server computer may determine that the file is likely to include malware. Continuing with the previous example, the server computer may determine that the file is malware-free because the total score, which in this example is −10, is less than the −5.

The server computer may notify the client computer that the file is likely to be malware-free or include malware. In the current example, the server computer may send data to a client computer indicating that the file is likely to be malware-free. In response, the client computer may open, display, and/or present the file to the user through one or more systems or devices, such as a monitor and/or speakers. However, if the server computer sends data to the client computer indicating the file is likely to include malware, the client computer may quarantine and/or delete the file. Additionally or alternatively, the client computer may present data to a user indicating whether the file is likely to be malware-free or include malware.

If the server computer does not determine that the file is likely to be malware-free or include malware, then the server computer may send data to the client computer indicating that the server computer is uncertain whether the file is likely to be malware-free and/or include malware. In response, the client computer may notify the user, and/or request input from the user as to whether the user wants to proceed to download, open, quarantine, and/or delete the file.

3.0 Anatomy of a File

A file may comprise digital data that can be characterized as one or more objects. An object may include one or more data items, such as a binary string, character string, XML, an image, compressed data, password protected/encrypted data, and/or any other data in any other format. An object may include one or more other objects. An object may include executable instructions, such as JavaScript, VBScript, Lua, Java, and/or any other scripting and/or programming language. An object that includes one or more executable instructions may be referred to herein as an instruction block. Executing an object may mean executing one or more instructions in the object.

A file may be a single file or a collection of files. For example, a file may be one or more files compressed, encoded, and/or contiguously stored in a computer storage device. Additionally or alternatively, a file may include one or more files that are not contiguously stored. For example, a first file may include a reference to a second file that is stored on a separate computer. The second file may be considered part of the first file because the first file references the second file. Additionally or alternatively, a file may comprise one or more embedded files, as discussed further herein. An embedded file may be a mixed content file and/or not an executable file.

3.1 Mixed Content Files

A file that includes multiple types of content may be referred to as a mixed content file. Each content type may include data and/or instructions. Examples of mixed content files may include HyperText Markup Language ("HTML") files and Portable Document Format ("PDF") files. An HTML file and/or PDF file may include data and/or instructions in one or more formats, such as eXtensible Markup Language ("XML"), HTML, JavaScript, Visual Basic Script ("VBScript"), images, and/or one or more data sets stored in one or more other formats, such as JavaScript Object Notation ("JSON") and/or JPEG. The data in a mixed content file may be structured data, such as XML. The structured data may include data and/or instructions that indicate how the data in the mixed content file should be displayed, played, and/or presented in a viewer program. For purposes of this disclosure, a "mixed content file" is not an executable program file.

An "executable file", or "executable program file", may comprise machine code instructions to be executed by a central processing unit ("CPU"). Machine code instructions may be executed by a CPU without assistance from, and/or interpretation by, additional software. An executable file may comprise byte code. Byte code need not be human-readable. For example, byte code need not include one or more words that a human is likely to identify and/or recognize from a dictionary for a spoken language. Byte code may comprise compact numeric codes, constants, references, and/or addresses that define types, scopes, and/or operations designed for efficient execution by a software interpreter, just-in-time compiler, and/or dynamic translator. An executable file may be designated by an underlying operating system as an executable file. For example, an operating system may determine that a file is executable if the file ends with a particular file extension, such as "EXE". An operating system may determine that a file is executable if the file is flagged as executable in a file system and/or file allocation table managed by the operating system.

In an embodiment, a mixed content file does not comprise machine code instructions and/or byte code, and/or have a file extension associated with an executable file. A mixed content file may be flagged in an operating system as not executable. For example, data in an operating system's file system or file allocation table may indicate that a mixed content file is not executable and/or an executable file.

3.2 Viewer Programs

A viewer program may be an executable program or file, which when executed may process a mixed content file and present data in the mixed content file according to the data structures and/or instructions in the mixed content file. For example, a viewer program may be a PDF viewer configured to parse a PDF file and execute one or more JavaScript and/or other instructions embedded in the PDF file. Also for example, a viewer program may be a HyperText Transfer Protocol ("HTTP") browser configured to request, receive, and/or process HTML files. The viewer program may be configured to present the data in an HTML file and execute one or more JavaScript and/or CSS instructions included in the HTML file.

4.0 Tests for Determining Whether a File Includes Malware

There are many tests that may be used to determine whether a file, such as a PDF file, HTML file, and/or mixed content file, is more likely to be malware-free or include malware. One or more of the following tests may be associated with a particular file specification, and may be executed against a file that purports to adhere to the particular file specification. One or more of the tests may be programming language specific and/or customized for a particular programming language, such as JavaScript.

Each test may be performed by malware detection logic. Malware detection logic may be software and/or hardware that is executed by, and/or coupled to, a malware detection computer. In an embodiment, a malware detection computer may be implemented using any of the techniques further described herein in connection with FIG. 3; for example, the malware detection computer may comprise a general-purpose computer configured with one or more stored programs which when executed cause performing the functions described herein for the malware detection computer, or a special-purpose computer with digital logic that is configured to execute the functions, or digital logic that is used in other computing devices.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

Each test discussed herein may be associated with a score that indicates whether a file is more likely to be malware-free or include malware. For purposes of illustrating clear examples herein, a test associated with a positive score may indicate that a file that satisfies the test is more likely to include malware; and, a test associated with a negative score may indicate that a file that satisfies the test is more likely to be malware-free. However, in an embodiment, a test associated with a negative score may indicate that a file that satisfies the test is more likely to include malware; and, a test associated with a positive score may indicate that a file that satisfies the test is more likely to be free of malware.

Malware detection logic may add the points associated with a test to a file's total score if any object in the file satisfies the test. For example, if malware detection logic determines a particular test is satisfied by one or more objects in a file, then the malware detection logic may add the number of points associated with the test to the total score for the file. Additionally or alternatively, the malware detection logic may add the number of points associated with the test to the total score for each object in the file that satisfies the test.

4.1 Testing for a Hidden Object

Malware detection logic may add a particular number of points to a file's total score if malware detection logic determines that an object in the file is configured to be hidden. The number of points may be 25 or any other number.

An object may be configured to be hidden in many ways. For example, an object may be an XML object with a property named "hidden" and a value set to "true" and/or a property named "display" set to "false". Additionally or alternatively, an object may be associated with a "Z-value" that indicates the object should be rendered visually behind one or more other objects in the file by the viewer program. If malware detection logic determines that an object that includes a property named "hidden" that is set to "true", a property named "display" that is set to "false", and/or a Z-value that is set to a value that may cause the object to be rendered behind one or more other objects, then malware detection logic may detect that the object is hidden.

4.2 Testing for Executable Instructions

Malware detection logic may add a particular number of points to a file's total score if malware detection logic determines that the file includes executable instructions, such as JavaScript. The number of points may be 25 or any other number.

Additionally or alternatively, malware detection logic may add a particular number of points to a file's total score if malware detection logic determines that the file includes executable instructions, such as JavaScript, embedded in XML. The number of points may be 50 or any other number.

Malware detection logic may detect executable instructions by scanning for or seeking keywords or syntax that are defined in one or more programming languages. For example, malware detection logic may detect JavaScript by looking for keywords such as "var", "function"; malware detection logic may detect XML by looking for words wrapped in angle brackets, such as "<script>" or "<header>". Malware detection logic may also include language-specific parsers that may identify one or more structure data languages, such as XML or JavaScript Object Notation ("JSON"), and/or one or more programming languages, such as JavaScript or VBScript.

4.3 Testing for Objects that are Automatically Executed

An object may be configured to be automatically executed by a viewer program when the file is opened and/or without receiving additional user input. An object that is configured to be automatically executed may be more likely to be malware. However, not all automatically executed objects are necessarily malicious. For example, a file may include an automatically executed object that determines the file's specification is supported by a viewer program. If the file's specification is not supported by the viewer program, then the automatically executed object may cause the viewer program to display a warning that the viewer program is too old.

Malware detection logic may have a copy of one or more automatically executed objects that are "safe" or not malicious. These objects may be referred to herein as safe object signatures. Malware detection logic may add a particular number of points to a file's total score if malware detection logic determines that each automatically executed object in the file matches a safe object signature. The number of points may be −100 or any other number.

Malware detection logic may add a particular number of points to a file's total score if malware detection logic determines a file includes one or more automatically executed objects that do not match a safe object signature. The number of points may be 25 or any other number.

Malware detection logic may determine that an object is configured to be automatically executed by a viewer program if the object is associated with a particular name, and/or if one or more instructions in an object are not enclosed in a function, class, module, or other object that is not automatically executed.

Malware detection logic may add a particular number of points to a file's total score if malware detection logic determines an automatically executed object includes and/or references a particular programming language. The number of points may be 50 or any other number. The particular programming language may be JavaScript.

4.4 Testing for Objects that are not Automatically Executed

Malware detection logic may add a particular number of points to a file's total score if malware detection logic determines no object in the file is automatically executed. The number of points may be −25 or any other number.

Instructions in a class, module, and/or function definition, and/or callback handler in an object may be automatically parsed, but not executed. For example, a print function may be defined in an object, and a viewer program may parse the print function when the file with the object is opened. However, the viewer program need not execute the print function until the print function is called by a callback handler and/or one or more other instructions.

Malware detection logic may detect whether one or more objects in a file are configured to be executed in response to user input and/or another event. For example, malware detection logic may parse each instruction in each object in a file. If each instruction in an object is part of a class, module, and/or function definition, and/or callback handler, then the malware detection logic may determine the object is not automatically executed.

4.5 Testing for Extractable Instructions

Extractable instructions may be instructions that are stored, compressed, and/or encoded in a format that is not executable until a viewer program performs one or more operations on the object. Extractable instructions in a first file may include instructions that are stored in a second file that is referenced by the first file.

Malware detection logic may add a particular number of points to a file's total score if malware detection logic determines a file includes one or more extractable instructions. The number of points may be 50 or any other number. The number of points may be based on the method the malware detection logic used to manually extract the instructions. For example, malware detection logic may add 30 points to the file's total score if malware detection logic determines that a file references a separate file, and after retrieving the separate file, malware detection logic determines that the separate file includes JavaScript. Malware detection logic may add 70 points to the file's total score if malware detection logic decompresses a string stored in the file and detects JavaScript in the decompressed string.

4.6 Testing for Obfuscated Instructions

Legitimate instructions included in a file may include names for variables and functions that are descriptive of the data stored in the variable, and/or the operations performed by the functions. Malicious programmers may obfuscate executable instructions in various ways. For example a malicious programmer may change one or more variable names and/or function names to one or more unusually long names, unusually short names, and/or names that are not words. Malware detection logic may add a particular number of points to a file's total score if malware detection logic determines that a file includes one or more executable instructions that have been obfuscated. The number of points may be 50 or any other number.

Malware detection logic may use one or more methods to determine whether one or more executable instructions have been obfuscated. For example, malware detection logic may identify one or more variable names and/or function names defined in one or more executable instructions. The malware detection logic may separate each name into one or more words based on special characters and/or casing. For example, the malware detection logic may separate a variable named "date_today" or "dateToday" into two words: date and today. Malware detection logic need not separate letters that do not appear to be two appended words. For example, malware detection logic need not separate "asdf1234" into two more words. Malware detection logic may determine how many words derived from variable or function names are found in one or more dictionaries. If a ratio of words found in one or more dictionaries to the total number of words is greater than or equal to a particular threshold, then malware detection logic may determine the instructions are not obfuscated; otherwise, malware detection logic may determine the instructions are obfuscated.

Additionally or alternatively, malware detection logic may determine that one or more executable instructions have been obfuscated if one or more character strings in the one or more instructions are URL-encoded, and/or encoded in another format other than plain text. Otherwise, the malware detection logic may determine that the one or more executable instructions are not obfuscated.

4.7 Testing for Suspicious Words

Suspicious words may be jargon that programmers use for various malicious exploits, such as "groom" and "spray". Jargon may be human-readable. Malware detection logic may add a particular number of points to a file's total score if malware detection logic determines that the file, and/or an object in the file, includes one or more suspicious words or jargon. Additionally or alternatively, malware detection logic may add a particular number of points to a file's total score if malware detection logic determines that the file includes one or more instructions and/or comments in a particular programming language that include suspicious words or jargon. The number of points may be 50 or any other number. The particular programming language may be JavaScript.

4.8 Testing with One or More Anti-Virus Engines

Anti-virus ("AV") engine may be software that searches a file for malware. Malware detection logic may add a particular number of points to a file's total score if malware detection logic invokes a particular number of AV engines to find malware in the file and determines that a particular percentage of the AV engines invoked find malware. For example, if malware detection logic determines that 10% of VirusTotal's AV engines find malware in a file, then malware detection logic may add 50 points, or any other number of points, to the file's total score.

4.9 Testing for Common Vulnerabilities and Exposures Signatures

A Common Vulnerabilities and Exposures ("CVE") signature may be a function or Application Program Interface ("API") supported by a viewer program that is undocumented and/or known to be susceptible to an exploit by malware. A "weak" CVE signature may be an API that has a known exploit. A "strong" CVE signature may be an API that is undocumented. For example, a viewer program may have a print function that it discussed in publicly released documentation for developers to use. Accordingly, the print function may be called by one or more instructions embedded in a file. If the print function is known to be susceptible to exploitation for malware, then the print function may be a weak CVE. If, however, the print function is not discussed in publicly released documentation, then the print function may be a strong CVE signature.

Malware detection logic may add a particular number of points to a file's total score if malware detection logic detects one or more weak CVE signatures in a file. For example, if malware detection logic finds, in a file, one or more instructions that call a print function that is a weak CVE signature, then the malware detection logic may add 25 points, or any other number of points, to the file's total score.

Malware detection logic may add a particular number of points to a file's total score if malware detection logic detects one or more strong CVE signatures in a file, and/or object in a file. The number of points may be 50 or any other number.

4.10 Testing for Data and/or Instructions after an End of File Tag

Malware detection logic may add a particular number of points to a file's total score if malware detection logic detects data and/or one or more instructions after an End of File ("EOF") tag. For example, a file may include an EOF tag, such as "%% EOF" or "<EOF>". If malware detection logic finds data and/or one or more instructions in a file after an EOF tag, then the malware detection logic may add 50 points, or any other number of points, to the file's total score.

4.11 Testing for Password Encryption

A file and/or an object in a file may be password protected or password encrypted. In response to receiving a correct password from a user for a file and/or object in the file, the viewer program may decrypt the file, and/or object in the file, and display the file and/or object to a user. A file, and/or object in the file, that is password encrypted may indicate that the file is meant for one or more select users, but not everyone. A file, and/or object in the file, that is password protected may indicate that the file is less likely to include malware because creators of malware may want as many users and/or computers to open the file and execute the malware as possible In contrast, if a file, and/or object in a file, appears to be password encrypted, but the password is blank, then a malware creator may be attempting to obfuscate malware in the file. A viewer program may be configured to decrypt a password encrypted file, and/or object in the file, with a blank password by default.

Malware detection logic may add a particular number of points to a file's total score if malware detection logic detects that a file, and/or object in the file, is password encrypted by a password that is not blank. The number of points may be −25 or any other number.

Malware detection logic may add a particular number of points to a file's total score if malware detection logic detects that a file, and/or object in the file, is password encrypted by a password that is blank. The number of points may be 25 or any other number.

4.12 Testing for Multiple Headers

A file that includes malware may also include an embedded file that is malware-free. The file that includes malware may be configured to cause a viewer program to present the embedded file that appears to be benign. Accordingly, if a particular file includes an embedded file, then the particular file may be more likely to include malware.

There are many ways for malware detection logic to detect that a first file includes an embedded second file. For example, malware detection logic may find a first header for the first file and a second header for the embedded second file. The first header may indicate that the first file adheres to a first specification, and the second header may indicate that the embedded second file adheres to a second specification. The first specification may, but need not be, the same as the second specification.

A header in a file may be defined in many ways. For example, an HTML file may include an opening header tag ("<header>") and a closing header tag ("</header>"). The data and/or instructions included between the opening header tag and the closing header tag may be the header. In a PDF file, a header may include a particular string, such as "% PDF-X.Y.%", where X.Y indicates that the file adheres to a particular specification with that version number.

Malware detection logic may add a particular number of points to a file's total score if malware detection logic detects that a file includes more than one header. The number of points may be 25 or any other number.

4.13 Testing for Safe Compression Filters

As discussed above, a file, and/or an object in a file, may include compressed data based on one or more compression filters. The file, and/or object in the file, may identify the one or more compressions filters used to compress the compressed data.

Malware detection logic may designate one or more compression filters to be "safe". A safe compression filter may be statistically more likely to be used in malware-free files. Malware detection logic may add a particular number of points to a file's total score if malware detection logic detects that a file, and/or an object in the file, includes data that was compressed using a safe compression filter. The number of points may be −25 or any other number.

4.14 Testing for Safe Code Signatures

As discussed above, a file may include one or more executable instructions in one or more programming languages. A set of one or more sequential instructions may be referred to herein as a snippet. Malware detection logic may designate a first set of one or more snippets as safe, and a second set of one or more snippets as malicious. A safe snippet may be referred to herein as a safe code signature, and a malicious snippet may be referred to herein as a malicious signature.

Each signature may be associated with a particular programming language. Accordingly, malware detection logic may test files that adhere to a specification that supports JavaScript with one or more safe JavaScript signatures and one or more malicious JavaScript signatures. Similarly, malware detection logic may test files that adhere to a specification that supports VBScript with one or more safe VBScript signatures and one or more malicious VBScript signatures.

Malware detection logic may add a particular number of points to a file's total score if the file includes one or more safe signatures. Additionally or alternatively, malware detection logic may add a particular number of points to a file's total score for each safe signature found in the file. Additionally or alternatively, malware detection logic may add a particular number of points to a file's total score if the file does not include any malicious signatures. The number of points may be −100 or any other number.

Malware detection logic may add a particular number of points to a file's total score if the file includes one or more malicious signatures. Additionally or alternatively, malware detection logic may add a particular number of points to a file's total score for each malicious signature found in the file. The number of points may be 50 or any other number.

4.15 Testing for a Limited Amount of Executable Instructions

A malware-free file may include one or more executable instructions. Malware detection logic may add a particular number of points to a file's total score if the file includes a particular number of executable instructions or fewer. The particular number may be one, two, or any other number. For example, malware detection logic may add −50 or any other number of points to a file's total score if the file includes two or fewer lines of JavaScript.

4.16 Testing for Validation Instructions

A malware-free file may include one or more executable instructions for purposes of validation. For example, an instruction block, such as a block of JavaScript code, may be configured to determine whether the characters that a user has entered into a particular field are formatted as a legitimate phone number or email address. Instructions that are used for validation may include one or more regular expressions, which may begin and end with one or more particular characters, such as a forward slash. Accordingly, malware detection logic may determine that one or more instructions are for purposes of validation if each instruction includes two forward slashes and/or includes the name of a field in the file.

Malware detection logic may add a particular number of points to a file's total score if malware detection logic determines that each executable instruction in the file is for purposes of validation. Additionally or alternatively, malware detection logic may add a particular number of points to a file's total score if malware detection logic determines that all executable instructions in the file are for purposes of validation. The number of points may be 50 or any other number.

5.0 Example Network Topology for Detecting Malware Embedded in One or More Mixed Content Files Stored at a Client Computer FIG. 1 illustrates a computer system for detecting malware embedded in one or more files stored and/or downloaded at a client computer in an example embodiment. In FIG. 1, system 100 includes client computer 110, malware detection server computer 130, and object and signature store 150, distributed across a plurality of interconnected networks.

While components may be illustrated as if running on a separate, remote computer from each other, one or more of the components listed above may be part of and/or executed on the same computer. For example, malware detection server computer 130 and object and signature store 150 may be executed on the same computer, local area network, and/or wide area network.

In the embodiment illustrated in FIG. 1, malware detection logic 135 determines whether a file received from a client computer is likely to be malware-free, likely to be include malware, or is "dubious". A file may be dubious if malware detection logic is unable to determine that the file is likely to be malware-free or include malware. However, in an embodiment, malware detection logic 135 may determine whether a file stored and/or downloaded locally is likely to be malware-free, likely to be include malware, or dubious. For example, viewer program 115 may be a browser. Malware detection logic 135 and object and signature store 150 may be a browser plugin in viewer program 115 that tests filed stored and/or downloaded by viewer program 115.

5.1 Malware Detection Server Computer

Malware detection server computer 130 may be a server computer that receives requests for data and responds with data. For example, a malware detection server computer may be an HTTP-based computer that receives HTTP mixed content requests, which include one or more files and responds with data indicating whether or not each of the one or more files is likely to include malware.

Malware detection server computer 130 includes malware detection logic 135. Malware detection logic 135 may be software and/or hardware that is executed by, and/or coupled to, malware detection server computer 130. Malware detection logic 135 may perform one or more of the tests discussed herein, and determine a total score for a file. Malware detection logic 135 may determine whether a file is likely to be malware-free, likely to be include malware, or dubious.

5.2 Object and Signature Store

Object and signature store 150 may be a data base and/or other storage system that stores one or more objects and/or signatures. For example, object and signature store 150 may include one or more weak CVE signatures, strong CVE signatures, JavaScript signatures, safe objects, malicious objects, AV engines, and/or any other data or logic used by malware detection logic 135 to determine whether a file is likely to include malware, dubious, and/or likely to be malware-free.

5.3 Client Computer

Client computer 110 may be a computer, such as a personal computer, tablet, and/or any other computer discussed herein that is capable of executing a viewer program, sending one or more files to a server computer, receiving data from a server computer. For example, client computer 110 may be a desktop computer that is capable of executing viewer program 115.

Viewer program 115 may be a PDF file viewer program, such as an email, HTML, and/or PDF browser viewer program, configured to present one or more files to a user using client computer 110. Viewer program 115 may be configured to download files from one or more server computers, send one or more files to malware detection server computer 130, and/or present results received from malware detection server computer 130 to a user.

In the embodiment illustrated in FIG. 1, viewer program 115 may send a file to malware detection server computer 130 for malware detection logic 135 to determine whether or not the file is likely to include malware, dubious, and/or likely to be malware-free. Viewer program 115 may present the results to a user using client computer 110 as discussed in detail further herein. However, in an embodiment, malware detection logic may be part of viewer program 115 and/or executed on client computer 110. For example, viewer program 115 may be a browser. Malware detection logic 135 and object and signature store 150 may be a browser plugin in viewer program 115 that tests filed stored and/or downloaded by viewer program 115. Viewer program 115 may download a PDF file and/or other file. Malware detection logic 135 may test the file on client computer 110 using data from object and signature store 150, which is stored locally on client computer 110. Viewer program 115 may present the results to a user using client computer 110 as discussed in detail further herein.

Figure 2:
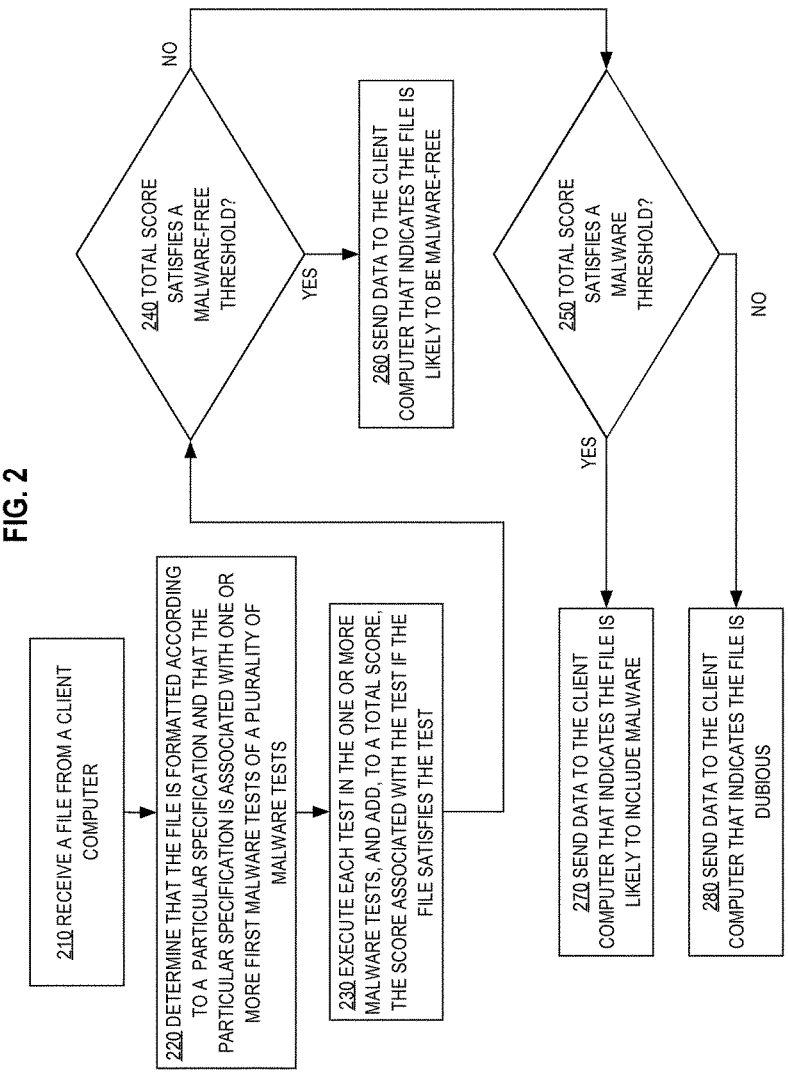
FIG. 2 illustrates a process for determining whether a mixed content file is likely to include malware in an example embodiment.

6.0 Example Process for Determining Whether a Mixed Content File is Likely to Include Malware FIG. 2 illustrates a process for determining whether a mixed content file is likely to include malware in an example embodiment. For purposes of illustrating a clear example, the steps may be described with references to one or more elements in one or more other figures, but using the particular arrangement illustrated in the one or more other figures is not required in other embodiments.

6.1 Receiving a Mixed Content File from a Client Computer

In step 210, a malware detection server computer receives a file from a client computer. For example, viewer program 115 may be a web browser that downloads and displays web pages and/or PDF files to a user using client computer 110. In response to receiving input from a user selecting a PDF file to display, viewer program 115 may download the PDF file, and send the PDF file to malware detection logic 135 on malware detection server computer 130. Viewer program 115 need not open, process, or persistently store the downloaded PDF file before receiving data from malware detection server computer 130 to determine whether each file is likely to be malware-free, likely to include malware, and/or dubious.

In an embodiment, viewer program 115 may include a listing for a plurality of malware detection server computers, each of which may detect whether a mixed content file is likely to be malware-free, likely to include malware, and/or dubious for one or more particular types and/or specifications. Accordingly, viewer program 115 may detect the type and/or specification of the mixed content file, and in response, send the mixed content file to one or more server computers that are each associated with the particular type and/or specification of the mixed content file. For example, viewer program 115 may determine the file selected by the user is a PDF file based on the file's extension, determine that malware detection server computer 130 and/or malware detection logic 135 is configured to determine whether the PDF file is likely to be malware-free, likely to include malware, and/or dubious; in response, viewer program 115 may send the PDF file to malware detection server computer 130 and/or malware detection logic 135. Also for example, viewer program 115 may determine that the file selected by the user is an HTML file and/or associated with a particular HTML version, determine that a different malware detection server computer is configured to determine whether the HTML file is likely to be malware-free, likely to include malware, and/or dubious; in response, viewer program 115 may send the HTML file to the different malware detection server computer.

6.2 Determining One or More Malware Tests to Execute Against the Mixed Content File In step 220, the malware detection server computer determines that the file is formatted according to a particular specification and that the particular specification is associated with one or more first malware tests of a plurality of malware tests. For example, malware detection logic 135 may determine that the PDF file received in the previous step has a header that indicates the PDF file adheres to a specification that supports embedded JavaScript instructions. Accordingly, malware detection logic 135 may select each of the tests based on JavaScript and/or JavaScript signatures discussed herein to be executed against the PDF file. However, malware detection logic 135 need not select test based on VBScript and/or VBScript signatures.

6.3 Determining Whether the Mixed Content File is Likely to Include Malware

In step 230, the malware detection server computer executes each test in the one or more malware tests, and adds, to a total score, the score associated with the test if the file satisfies the test. Continuing with the previous example, malware detection logic 135 may execute each of the tests discussed herein against the PDF file received in step 210. For each test that the PDF file satisfies, malware detection logic 135 may add the score associated with the test to total score.

6.4 Determining Whether the Mixed Content File is Likely to be Malware-Free, Likely to Include Malware, or Dubious In step 240, the malware detection server computer determines whether the total score satisfies a malware-free threshold. For example, malware detection logic 135 may be configured to determine that a PDF file is likely to be malware-free if the total score for the PDF file is equal to or below −200 or some other value. If so, then malware detection logic 135 may determine that the total score satisfies the malware-free threshold and control may proceed to step 260; otherwise, malware detection logic 135 may determine that the total score does not satisfy the malware-free threshold and control may proceed to step 250.

In step 250, the malware detection server computer determines whether the total score satisfies a malware threshold. For example, malware detection logic 135 may be configured to determine that a PDF file is likely to include malware if the total score for the PDF file is equal to or above 200 or some other value. If so, then malware detection logic 135 may determine that the total score satisfies the malware threshold and control may proceed to step 270; otherwise, malware detection logic 135 may determine that the total score does not satisfy the malware threshold and control may proceed to step 280.

In the examples above, the malware-free threshold is a maximum threshold and the malware-free threshold is a minimum threshold. Accordingly, a total score for a file satisfies a malware-free threshold (a maximum threshold) if the total score is less than or equal to the malware-free threshold, and the total score satisfies a malware threshold (a minimum threshold) if the total score is greater than or equal to the malware threshold. However, in an embodiment, the malware-free threshold may be a minimum threshold and the malware-free threshold may be a maximum threshold. Accordingly, a total score for a file satisfies a malware-free threshold (a minimum threshold) if the total score is greater than or equal to the malware-free threshold, and the total score satisfies a malware threshold (a maximum threshold) if the total score is less than or equal to the malware threshold.

In an embodiment, the malware-free threshold and the malware threshold are the same, single malware threshold. Accordingly, a result for a file may be binary: likely to be malware-free or likely to include malware. For example, if the single malware threshold is a minimum threshold and malware detection logic 135 determines that the total score of a PDF file is less than or equal to the single malware threshold, then malware detection logic 135 may determine that the total score does not satisfy the single malware threshold, the PDF file is likely to be malware-free, and control may proceed to step 260. Additionally or alternatively, if the single malware threshold is a minimum threshold and malware detection logic 135 determines that the total score of the PDF file is equal to or greater than the single malware threshold, then malware detection logic 135 may determine that the total score does satisfy the single malware threshold, the PDF file is likely to include malware, and control may proceed to step 270.

In an embodiment, the single malware threshold may be a maximum threshold. For example, if the single malware threshold is a maximum threshold and malware detection logic 135 determines that the total score of a PDF file is less than or equal to the single malware threshold, then malware detection logic 135 may determine that the total score does satisfy the single malware threshold, the PDF file is likely to include malware, and control may proceed to step 270. Additionally or alternatively, if the single malware threshold is a maximum threshold and malware detection logic 135 determines that the total score of the PDF file is equal to or greater than the single malware threshold, then malware detection logic 135 may determine that the total score does not satisfy the single malware threshold, the PDF file is likely to be malware-free, and control may proceed to step 270.

6.5 Notifying the Client Computer and Acting on the Determination Made by the Malware Detection Logic In step 260, the malware detection server computer sends data to the client computer that indicates the file is likely to be malware-free. For example, malware detection logic 135 may send viewer program 115 data indicating that the file is likely to be malware free. In response, viewer program 115 may open, process, execute, and/or persistently store the PDF file on client computer 110. Accordingly, viewer program 115 may cause the PDF file to be displayed on a display coupled to client computer 110. Additionally or alternatively, viewer program 115 may cause a message to be displayed on a display coupled to client computer 110 indicating that the PDF file is, or is likely to be, malware-free.

In step 270, the malware detection server computer sends data to the client computer that indicates the file is likely to include malware. For example, malware detection logic 135 may send viewer program 115 data indicating that the file is likely to include malware. In response, viewer program 115 may cause an error message to be displayed on a display coupled to client computer 110 indicating that viewer program 115 will not open the PDF file because the PDF file is likely to include malware. Additionally or alternatively, in response to receiving data indicating that the file is likely to include malware, viewer program 115 may delete the PDF file from memory without opening, processing, executing, and/or persistently storing the PDF file on client computer 110. Additionally or alternatively, viewer program 115 may present a button, and/or other input, to a user which if selected, may cause viewer program 115 to open, process, execute, and/or persistently store the PDF file regardless of the data received from malware detection logic 135. Viewer program 115 may give one or more additional warnings that the PDF file does, or is likely to, include malware that could harm and/or compromise client computer 110.

In step 280, the malware detection server computer sends data to the client computer that indicates the file is dubious. For example, malware detection logic 135 may send viewer program 115 data indicating that the file is dubious. In response to receiving data that the PDF file is not likely to include malware, viewer program 115 may cause client computer 110 to display an alert indicating that the PDF file may include malware, and wait for input from the user as to whether the user would like viewer program 115 to open, process, execute and/or persistently store the PDF, or delete the PDF file from memory without opening, processing, executing, and/or persistently storing the PDF file.

7.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
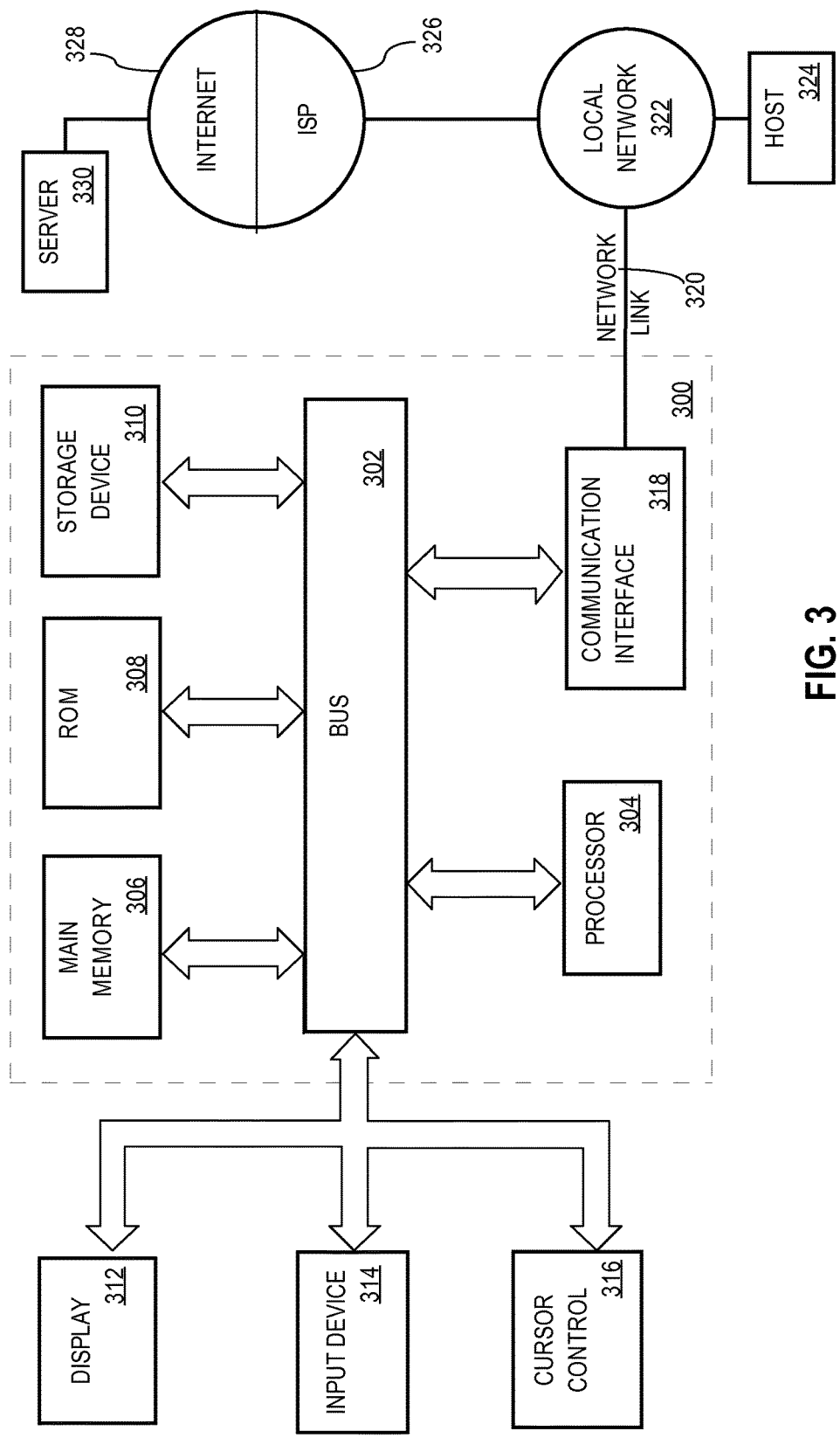
FIG. 3 illustrates a computer system upon which an embodiment may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of a client computer, the system comprising:
    a memory;
    one or more processors coupled to the memory;
    a malware detection logic coupled to the memory and the one or more processors, and configured to:
    receive a first file from a viewer program that is executing on the client computer, wherein the first file is a mixed content file comprising a combination of both executable instructions and data in one or more formats, and/or one or more data sets stored in one or more other formats;
    determine that the first file is formatted according to a first specification and that the first specification is associated with one or more first malware tests of a plurality of malware tests, wherein each test in the plurality of malware tests is associated with a score;
    execute each test in the first one or more malware tests, and add, to a first total score, the score associated with the test if the first file satisfies the test, wherein the first one or more malware tests comprises at least one of: determining that the first file is marked as password encrypted and further determining that the first file specifies a password to decrypt the first file as a blank password; or determining that the first file includes one or more JavaScript instructions after an End-of-File (EOF) tag present in the file, wherein the EOF tag is an indicator of the end of the file;
    determine the first total score satisfies a first threshold, and in response, send data to the viewer program indicating that the first file is likely to include malware.

2. The computer system of claim 1, wherein, of the one or more first malware tests, a particular test is satisfied if the first file includes one or more JavaScript instructions that are for purposes of validation.

3. The computer system of claim 1, wherein, in response to receiving data indicating that the first file is likely to include malware, the viewer program is configured to delete the first file from memory without persistently storing the first file.

4. The computer system of claim 1, wherein, in response to receiving data indicating that the first file is likely to include malware, the viewer program is configured to cause displaying a message indicating that the first file is likely to include malware.

5. The computer system of claim 1, wherein the malware detection logic is software executed on a server computer, and the malware detection logic receives the first file from the viewer program over one or more computer networks.

6. The computer system of claim 1, wherein the first file is in portable document format, and includes JavaScript.

7. The computer system of claim 1, wherein the malware detection logic is configured to:
    receive a second file from a viewer program;
    determine that the second file is formatted according to the first specification;
    execute each test in the first one or more malware tests, and add, to a second total score, the score associated with the test if the second file satisfies the test;
    determine the second total score satisfies a second threshold, and in response, send data to the viewer program indicating that the second file is likely to be malware-free.

8. The computer system of claim 7, wherein, in response to receiving data indicating that the second file is likely to be malware-free, the viewer program is configured to cause displaying the second file.

9. The computer system of claim 1, wherein the malware detection logic is configured to:
    receive a second file from a viewer program;
    determine that the second file is formatted according to a second specification and the second specification is associated with one or more second malware tests of the plurality of malware tests, wherein at least one test in the one or more second malware tests is not in the one or more first malware tests;

execute each test in the one or more second malware tests, and add, to a second total score, the score associated with the test if the second file satisfies the test;

determine the second total score satisfies a first threshold, and in response, send data to the viewer program indicating that the second file is likely to include malware.

10. The computer system of claim 1, wherein, of the one or more first malware tests, a particular test is satisfied if the first file includes a block of JavaScript, and the block of JavaScript includes one or more suspicious words that are known jargon terms for malicious exploits.

11. A method for improving security of a client computer, the method comprising:

receiving, at a viewer program, from a server computer, a mixed content file comprising a combination of both executable instructions and data in one or more formats, and/or one or more data sets stored in one or more other formats according to a particular specification;

determining that a malware detection server computer is configured to determine whether the mixed content file is formatted according to the particular specification;

before processing the mixed content file, sending the mixed content file to a malware detection server computer, wherein the malware detection server computer is configured to determine whether the mixed content file is formatted according to the particular specification, and in response, perform one or more first malware test of a plurality of malware tests to determine whether the mixed content file is likely to include malware, wherein the first one or more malware tests comprises at least one of: determining that the first file is marked as password encrypted and further determining that the first file specifies a password to decrypt the first file as a blank password; or determining that the first file includes one or more JavaScript instructions after an End-of-File (EOF) tag present in the file, wherein the EOF tag is an indicator of the end of the file;

receiving, from the malware detection server computer, a result indicating whether the mixed content file is likely to include malware;

wherein the method is performed by one or more computing devices.

12. The method of claim 11 comprising determining that the mixed content file is likely to include malware based on the result, and in response:

deleting the mixed content file from memory without persistently storing or processing the mixed content file;

causing displaying a message indicating that the mixed content file includes malware and deleted before the mixed content file was persistently stored or processed by the viewer program.

13. The method of claim 11 comprising determining that the mixed content file is likely to be malware-free based on the result, and in response:

processing the mixed content file;

executing one or more executable instructions included in the mixed content file;

causing displaying data in the mixed content file according to the one or more executable instruction included in the mixed content file.

14. The method of claim 11, wherein the viewer program is executed by a client computer, and the method comprising determining that the mixed content file is likely to be malware-free based on the result, and in response:

causing displaying a message indicating that the mixed content file is malware-free;

persistently storing the mixed content file on client computer.

15. The method of claim 11 comprising determining that the mixed content file is dubious based on the result, and in response:

deleting the mixed content file from memory without persistently storing, opening, or processing the mixed content file;

causing displaying a message indicating that the mixed content file may include malware.

16. The method of claim 11 comprising:

determining that the mixed content file is dubious based on the result, and in response, causing displaying a message indicating that the mixed content file may include malware;

receiving input from a user indicating that the user would like to proceed, and in response:

processing the mixed content file;

executing one or more executable instructions included in the mixed content file;

causing displaying data in the mixed content file according to the one or more executable instruction included in the mixed content file.

17. The method of claim 11 comprising:

determining that the mixed content file is dubious based on the result, and in response, causing displaying a message indicating that the mixed content file may include malware;

receiving input from a user indicating that the user would not like to proceed, and in response:

deleting the mixed content file from memory without persistently storing, opening, or processing the mixed content file;

causing displaying a message indicating that the mixed content file may include malware.

18. The method of claim 11, wherein, of the one or more first malware tests, a particular test is satisfied if the first file includes a block of JavaScript, and the block of JavaScript includes one or more suspicious words that are known jargon terms for malicious exploits.

* * * * *